Patented Mar. 29, 1932

1,851,114

UNITED STATES PATENT OFFICE

ROBERT E. SCHMIDT, BERTHOLD STEIN AND KURT BAMBERGER, OF ELBERFELD, GERMANY, ASSIGNORS TO GENERAL ANILINE WORKS, INC., OF NEW YORK, N. Y., A CORPORATION OF DELAWARE

NEW VAT DYESTUFFS OF THE N-DIHYDRO-1.2-2'.1'-ANTHRAQUINONE AZINE SERIES

No Drawing. Application filed March 26, 1929, Serial No. 350,129, and in Germany April 7, 1928.

The present invention relates to new vat dyestuffs of the N-dihydro-1.2-2'.1'-anthraquinone azine series and to a process of preparing same.

We have found, that new and technically valuable dyestuffs are obtainable by reacting upon a halogenated N-dihydro-1.2-2'.1'-anthraquinone azine, the nuclei of which may be further substituted, such as 4.4'-dibromo-, 3.3'-dibromo-, 4.4'-diamina-3.3'-dichloro, chloro-4.4'-dihydroxy-, 3-chloro-N-dihydro-1.2-2'.1'-anthraquinone azine and the like, with cuprous cyanide in the presence of a liquid tertiary cyclic base, such as quinoline, quinaldine, pyridine or the like at temperatures between about 200–250° C., the cuprous cyanide being applied in a quantity amounting to at least one molecule for every halogen atom being present in the starting material.

The reaction will be finished as soon as a sample worked up in the usual manner no longer contains halogen.

The products thus obtainable, the exact constitution of which is unknown up to date, but which are believed to contain cyano groups, form dark powders, dyeing cotton from a hydrosulfite vat strong blue to green shades, which are in all cases greener than those of the starting materials.

The following example illustrates our invention, without limiting it thereto, the parts being by weight:

*Example.*—6 parts of 3.3'-dibromo-N-dihydro-1.2-2'.1'-anthraquinone azine are boiled with 300 parts of quinoline and 3 parts of cuprous cyanide until a cooled sample separates halogen-free crystals. The reaction mixture is then allowed to cool and the reaction product, separating in beautiful prisms glittering like copper, is sucked off and washed with alcohol. The removal of the copper compounds being present may be performed in the usual manner, for instance by boiling with aqueous ammonia with the addition of ammonium chloride, or by extracting with a hot aqueous alkali metal cyanide solution. The new product dissolves in concentrated sulfuric acid with a greenish-yellow coloration. When pouring the solution into water, beautiful blue flakes deposit. From its blue alkaline hydrosulfite vat, cotton is dyed a beautiful blue, being more greenish than the dyeing of the starting material.

We claim:

1. Process which comprises reacting upon a halogenated N-dihydro-1.2-2'.1'-anthraquinone azine with cuprous cyanide in a quantity amounting to at least one molecule for every halogen atom being present in the presence of a liquid tertiary hetero cyclic starting material, in the base and at a temperature of about 200–250° C.

2. Process which comprises reacting upon a halogenated N-dihydro-1.2-2'.1'-anthraquinone azine with cuprous cyanide in a quantity amounting to at least one molecule for every halogen atom being present in the starting material, in the presence of quinoline and at a temperature of about 200–250° C.

3. Process which comprises reacting upon 3.3'-dibromo-N-dihydro-1.2-2'.1'-anthraquinone azine with cuprous cyanide in a quantity amounting to at least one molecule for every halogen atom being present in the starting material, in the presence of a liquid tertiary hetero cyclic base and at a temperature of about 200–250° C.

4. Process which comprises reacting upon 3.3'-dibromo-N-dihydro-1.2-2'.1'-anthraquinone azine with cuprous cyanide in a quantity amounting to at least one molecule for every halogen atom being present in the starting material, in the presence of quinoline and at a temperature of about 200–250° C.

5. Process which comprises reacting upon 6 parts by weight of 3.3'-dibromo-N-dihydro-1.2-2'.1'-anthraquinone azine with 3 parts by weight of cuprous cyanide in quinoline solution at the boiling point of the mixture.

6. The products being obtainable according to the process claimed in claim 1, said products being dark powders, dyeing cotton from an alkaline hydrosulfite vat strong blue to green shades being greener than those of the starting materials.

7. The product being obtainable according to the process claimed in claim 5, said product forming copper-like glittering prisms, dissolving in concentrated sulfuric acid with a greenish-yellow coloration, dyeing cotton from an alkaline hydrosulfite vat a beautiful blue shade being more greenish than that of 3.3'-dibromo-N-dihydro-1.2-2'.1'-anthraquinone azine.

8. Process which comprises reacting upon a halogenated N-dihydro-1.2-2'.1-anthraquinone azine with cuprous cyanide in a quantity amounting to at least one molecule for every halogen atom being present in the starting material, in the presence of pyridine and at a temperature of about 200–250° C.

9. Process which comprises reacting upon a halogenated N-dihydro-1.2-2'.1'-anthraquinone azine with cuprous cyanide in a quantity amounting to at least one molecule for every halogen atom being present in the starting material, in the presence of quinaldine, and at a temperature of about 200–250° C.

10. Process which comprises reacting upon 3.3'-dibromo-N-dihydro-1.2-2'.1'-anthraquinone azine with cuprous cyanide in a quantity amounting to at least one molecule for every halogen atom being present in the starting material, in the presence of pyridine, and at a temperature of about 200–250° C.

11. Process which comprises reacting upon 3.3'-dibromo-N-dihydro-1.2-2'.1'-anthraquinone azine with cuprous cyanide in a quantity amounting to at least one molecule for every halogen atom being present in the starting material, in the presence of quinaldine, and at a temperature of about 200–250° C.

In testimony whereof we have hereunto set our hands.

ROBERT E. SCHMIDT. [L. S.]
BERTHOLD STEIN. [L. S.]
KURT BAMBERGER. [L. S.]

CERTIFICATE OF CORRECTION.

Patent No. 1,851,114.                                                                            March 29, 1932.

ROBERT E. SCHMIDT ET AL.

It is hereby certified that error appears in the printed specification of the above numbered patent requiring correction as follows: Page 1, line 59, claim 1, after the word "present" insert the words and comma in the starting material, and line 61, strike out the words "starting material in the; and that the said Letters Patent should be read with these corrections therein that the same may conform to the record of the case in the Patent Office.

Signed and sealed this 12th day of July, A. D. 1932.

(Seal)                                                          M. J. Moore,
                                                            Acting Commissioner of Patents.